US008842023B2

(12) United States Patent
Potter, Sr. et al.

(10) Patent No.: US 8,842,023 B2
(45) Date of Patent: Sep. 23, 2014

(54) BICYCLE DETECTOR

(75) Inventors: Thomas R. Potter, Sr., Reno, NV (US); Lu Jason Zhen-Yu, Sparks, NV (US); Mysz Christopher, Reno, NV (US)

(73) Assignee: Reno A & E, Reno, NV (US)

( * ) Notice: Subject to any disclaimer, the term of this patent is extended or adjusted under 35 U.S.C. 154(b) by 447 days.

(21) Appl. No.: 13/385,035

(22) Filed: Jan. 30, 2012

(65) Prior Publication Data

US 2013/0194111 A1 Aug. 1, 2013

(51) Int. Cl.

| | |
|---|---|
| ***G08G 1/01*** | (2006.01) |
| *G08G 1/00* | (2006.01) |
| *G08G 1/095* | (2006.01) |
| *G08G 1/07* | (2006.01) |
| *G06F 19/00* | (2011.01) |
| *G01S 13/00* | (2006.01) |

(52) U.S. Cl.
USPC .......... 340/933

(58) Field of Classification Search
USPC .......... 340/933, 907, 901, 909; 701/117; 342/24
See application file for complete search history.

(56) References Cited

U.S. PATENT DOCUMENTS

| | | | | |
|---|---|---|---|---|
| 3,750,125 A * | 7/1973 | Ross et al. | ..... | 340/561 |
| 3,875,555 A * | 4/1975 | Potter | ..... | 340/939 |
| 4,358,749 A * | 11/1982 | Clark | ..... | 340/941 |
| 5,917,432 A * | 6/1999 | Rathbone | ..... | 340/907 |
| 6,617,981 B2 * | 9/2003 | Basinger | ..... | 340/909 |
| 7,221,289 B2 * | 5/2007 | Hom | ..... | 340/933 |
| 2008/0218380 A1 * | 9/2008 | Wall et al. | ..... | 340/907 |

* cited by examiner

*Primary Examiner* — Jack K Wang

(57) ABSTRACT

A vehicle detector capable of detecting motorized vehicles, bicycles only or both types of vehicle in a loop near a controlled intersection. The vehicle detector includes a processor under control of machine readable code for controlling the operation of one or more oscillators coupled to one or more loops. Manually actuatable switches enable the entry of mode settings—i.e., motorized vehicle and bicycle detect or bicycle only detect—and clearance time parameters for ensuring that one or more bicycles can safely proceed through an intersection when given a green light. Selection of the Bicycle detect mode is denoted by the entry of a non-zero value in an initial timer using one or more of the switches.

20 Claims, 6 Drawing Sheets

BICYCLE DETECTOR

REFERENCE TO COMPUTER PROGRAM LISTING

This application includes a computer program listing appendix submitted on the accompanying compact disc containing a single file entitled "test.LST" created on Jul. 19, 2011 and having a file size of 2,331 Kbytes. Two discs having identical copies of the file accompany this application and are identified as "Copy 1" and "Copy 2". The material contained on each disc is hereby incorporated by reference.

BACKGROUND OF THE INVENTION

This invention relates to vehicle detector systems used to detect the presence or absence of a motor vehicle over an inductive loop embedded in the pavement. More particularly, this invention relates to a vehicle detector system capable of detecting both motorized vehicles and bicycles for purposes of traffic control and for distinguishing bicycles from motorized vehicles.

Vehicle detectors have been used for a substantial period of time to generate information specifying the presence or absence of a vehicle at a particular location sometimes termed a detection zone. Such detectors have been used at intersections, for example, to supply information used by an associated traffic control unit to control the operation of the traffic signal heads, and have also been used to supply control information used in conjunction with automatic entrance and exit gates in parking lots, garages and buildings. A widely used type of vehicle detector employs the principle of period shift measurement in order to determine the presence or absence of a vehicle in or adjacent to the inductive loop mounted on or in a roadway. In such systems, a first oscillator, which typically operates in the range from about 20 kHZ to about 100 kHZ is used to produce a periodic signal in a vehicle detector loop. A second oscillator operating at a much higher frequency is commonly used to generate a sample count signal over a fixed number of loop cycles. The relatively high frequency count signal is typically used to increment a counter, which stores a number corresponding to the sample count at the end of the fixed number of loop cycles. This sample count is compared with a reference count stored in another counter and representative of a previous count in order to determine whether a vehicle has entered or departed the region of the loop in the time period between the previous sample count and the present sample count.

The initial reference value is obtained from one or more initial sample counts and stored in a reference counter. Thereafter, successive sample counts are obtained on a periodic basis, and compared with the reference count. If the two values are essentially equal, the condition of the loop remains unchanged, i.e., a vehicle has not entered or departed the loop. However, if the two numbers differ by at least a threshold amount in a first direction (termed the Call direction), the condition of the loop has changed and may signify that a vehicle has entered the loop. More specifically, in a system in which the sample count has decreased and the sample count has a numerical value less than the reference count by at least a threshold magnitude, this change signifies that the period of the loop signal has decreased (since fewer counts were accumulated during the fixed number of loop cycles), which in turn indicates that the frequency of the loop signal has increased, usually due to the presence of a vehicle in or near the loop. When these conditions exist, the vehicle detector generates a signal termed a Call signal indicating the presence of a vehicle in the loop.

Correspondingly, if the two numbers differ by less than a second threshold amount in a second direction (termed the No Call direction), this condition indicates that a vehicle which was formerly located in or near the loop has departed the detection zone. When this condition occurs, a previously generated Call signal is dropped.

The difference between a sample count N and a reference count R is representative of the inductance change in a loop circuit at the end of the time period between the former sample count (the reference count R) and the current sample count N. More particularly, the quantity $\Delta L/L = k\Delta N/N$, where L=loop inductance and k is a scaling factor, expresses the relationship between numerical counts and loop inductance.

The Call signal can be either a pulse signal or a presence signal. A pulse signal is a fixed length pulse generated when the vehicle is detected in the loop. A presence signal is a signal which continually persists so long as the vehicle remains in the loop. Some vehicle detectors are provided with a presence/pulse selection feature, which causes the vehicle detector to generate one of these two types of Call signals.

Call signals are used in a wide variety of applications, including vehicle counting along a roadway or through a parking entrance or exit, vehicle speed between preselected points along a roadway, vehicle presence at an intersection controlled by a traffic control light system, or in a parking stall, and numerous other applications.

In addition to the basic function of generating and dropping a Call signal, existing vehicle detectors incorporate other features, some of which are selectable on-site by a technician. For example, some vehicle detectors incorporate an end of green function which requires the detector to automatically reset after the green traffic signal, which controls the lane in which the loop associated with the vehicle detector is located, terminates. Some vehicle detectors are provided with an extension time feature which extends the Call signal for a period of time after a vehicle leaves the associated loop (typically in order to permit ample minimum time for a vehicle to clear an intersection). Some vehicle detectors are also provided with a presence/pulse selection feature, which causes the vehicle detector to generate one of two types of Call signals: a continually persisting signal so long as the vehicle remains in the loop (the presence function); or a fixed length pulse generated when the vehicle is first detected in the loop, or when the vehicle departs the loop (the pulse function). Still other vehicle detectors are provided with selectable different sensitivity settings, which enable a technician to adjust the response of the vehicle detector when connected to the loop in order to accommodate a range of detection conditions.

In the past, vehicle detectors have been designed as either single channel or multiple channel detectors. A single channel detector is designed and configured to operate with only a single loop zone; while a multiple channel vehicle detector is designed and configured to operate with two or more independent loop zones. Multiple channel detectors are designed to be either scanning or non-scanning detectors. A scanning detector operates by sampling only one loop channel at a time, shutting down the active loop, sampling the next loop channel, shutting down that loop, etc. Scanning detectors are typically used in installations in which the probability of cross-talk between loop circuits is more than minimal. Cross talk results when physically adjacent loops are operating at, or near, the same frequency. Cross talk is minimized or eliminated by operating physically adjacent loops on different frequencies. Non-scanning vehicle detectors are configured and function to monitor each of the multiple loop zones simultaneously. Non-scanning detectors are typically used in installations in which there is a very low or no possibility of cross-talk between the multiple loop circuits, such as installations at which the loops are physically separated by a distance sufficient to ensure no overlapping or inter-coupling between the electrical fields associated with the loops. An example of a vehicle detector incorporating the functions described above is disclosed in U.S. Pat. No. 6,087,964 issued Jul. 11, 2000 for "Vehicle Detector With Operational Display", the disclosure of which is hereby incorporated by reference.

When deployed in an intersection controlled by a traffic control light system, vehicle detectors generate signals which are used by the intersection traffic controller to supervise the operational states of the traffic control heads in response to the arrival and departure of vehicles over loops installed in the various lanes leading to the intersection. One of the key parameters required for the orderly progression of vehicles through an intersection is the clearance time provided for motorized vehicles present at the intersection. In known traffic control systems, the clearance time value is usually selected to allow a motorized vehicle (i.e. an auto, truck, or motorcycle) sufficient time to safely proceed through an intersection when a green phase is presented to a vehicle, without unnecessarily lengthening the duration of the green phase. While this technique works well for motorized vehicles, bicycles present a problem due to the fact that a bicycle typically requires a longer period of time to safely proceed through an intersection than a motorized vehicle. While this problem can be addressed by simply lengthening the period of the initial time and the extension time for all vehicles, this solution is not satisfactory since it inordinately lengthens the duration of the green phase, regardless of whether or not a bicycle is present at an intersection waiting for the green phase to proceed.

Efforts prior to this invention to accommodate the longer intersection clearance time required for bicycles without compromising the efficiency of normal traffic flow have not met with success.

SUMMARY OF THE INVENTION

The invention comprises an improved vehicle detector which is capable of detecting motorized vehicles and bicycles, which is capable of discriminating between a bicycle and a motorized vehicle, and which is capable of providing the longer clearance time required by a bicycle to safely proceed through a controlled intersection when a bicycle is present while providing the normal clearance time for motorized vehicles present at the same intersection when no bicycle is present.

In a broadest apparatus aspect, the invention comprises a vehicle detector with bicycle detect and discrimination capability and having an oscillator adapted to be coupled to a loop adjacent an intersection; a memory; and a processor operatively coupled to the oscillator and the memory. The memory has machine readable code stored therein which is configured to enable the processor to activate the oscillator to produce a signal for the loop, to implement a loop cycle counter for counting a predetermined number of loop oscillator cycles defining a sample period, to implement a sample counter for accumulating sample counts during the predetermined number of loop oscillator cycles; to implement a reference counter for storing a reference count based on the accumulated sample counts from a previous sample period; to implement an evaluation unit for determining from the sample counts and the reference count whether a vehicle has entered the loop during the sample period and for determining from the sample counts N and the reference count R whether a detected vehicle is a bicycle; and to implement a Call signal generator for generating a Call signal when the evaluation unit has determined that a vehicle has entered the loop during the sample period.

When arranged as a stand-alone unit to control the duration of the bicycle clearance interval, the vehicle detector includes machine readable code for enabling the processor to implement an Initial timer for establishing a clearance time sufficient to permit a bicycle to safely start and proceed through the intersection when the evaluation unit has determined that a bicycle has entered the loop during the sample period. When motorized vehicles are detected the call signal is provided without any conditioning for either initial time or extension time. When arranged for use with a traffic controller having the processing capability to perform these timing functions, the vehicle detector can be modified to simply provide to the traffic controller a first output signal indicating that a motorized vehicle has been detected and a second output signal indicating that a bicycle has been detected. In response to the receipt of such signals, the traffic controller can then perform the timing signal processing for controlling the duration of the clearance interval.

The vehicle detector preferably includes a plurality of manually actuatable switches for enabling selection of a bicycle detect mode of operation; and the machine readable code is configured to enable the processor to determine whether the bicycle detect mode of operation has been selected. The machine readable code is further configured to enable the processor to examine and interpret the actuation of at least one of the plurality of manually actuatable switches as a bicycle clearance time value to be used for the initial timer; and the machine readable code is also configured to enable the processor to determine selection of the bicycle detect mode of operation when the value of the bicycle clearance time is non-zero.

The plurality of manually actuatable switches also enables entry of a value corresponding to the selection of a bicycle only detect mode of operation in which only bicycles provide a CALL signal; and the machine readable code is configured to enable the processor to determine whether the bicycle only detect mode of operation has been selected.

The machine readable code is also configured to enable the processor to examine and interpret the actuation of at least one of the plurality of manually actuatable switches as an extension time value to be used for the initial timer value when a subsequent bicycle is detected over the loop in order to provide additional bicycle clearance time for the subsequent bicycle. The machine readable code is also configured to enable the processor to compare the present value of the contents of the bicycle initial timer with the bicycle extension time value, to select the extension time value as the bicycle clearance time when the extension time value exceeds the current initial time value, and to continue to use the current initial time value otherwise.

The vehicle detector preferably includes a squaring circuit coupled between the oscillator and the processor for processing the signal produced by the oscillator when activated by the processor.

The machine readable code is configured to enable the processor to detect a bicycle by determining from the sample counts N and the reference count R whether the ratio of $\Delta L/L$, where L is the loop inductance, lies within a range from a non-zero value to a preselected maximum value Bmax. Bmax is preferably 0.7%.

Alternatively, the machine readable code is configured to enable the evaluation unit to detect a bicycle by determining from the sample counts N and the reference count R whether the signature derived from a collection of ratios of $-\Delta L/L$, where L is the loop inductance, indicates a bicycle or a motorized vehicle.

Vehicle detectors incorporating the invention are preferably used in combination with a pre-formed loop having a parallelogram configuration, with the loop installed in the roadbed extending across a given traffic lane. In some installations, the parallelogram has two opposing sides which are substantially coincident with opposing edges of the traffic lane; in other installations, the opposing sides of the parallelogram terminate inboard of the opposing edges of the traffic lane. Preferably, the loop has an external sheath fabricated from cross-linked polyethylene and a water block material is incorporated within the outer sheath.

Vehicle detectors incorporating the invention provide both conventional motorized vehicle detection and bicycle detection and discrimination without compromising the efficiency of normal traffic flow. In addition, bicycle only detection can be selected for any traffic lane monitored by the vehicle detector, which is useful in counting the number of bicycles using a given traffic lane or a bicycles only lane.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
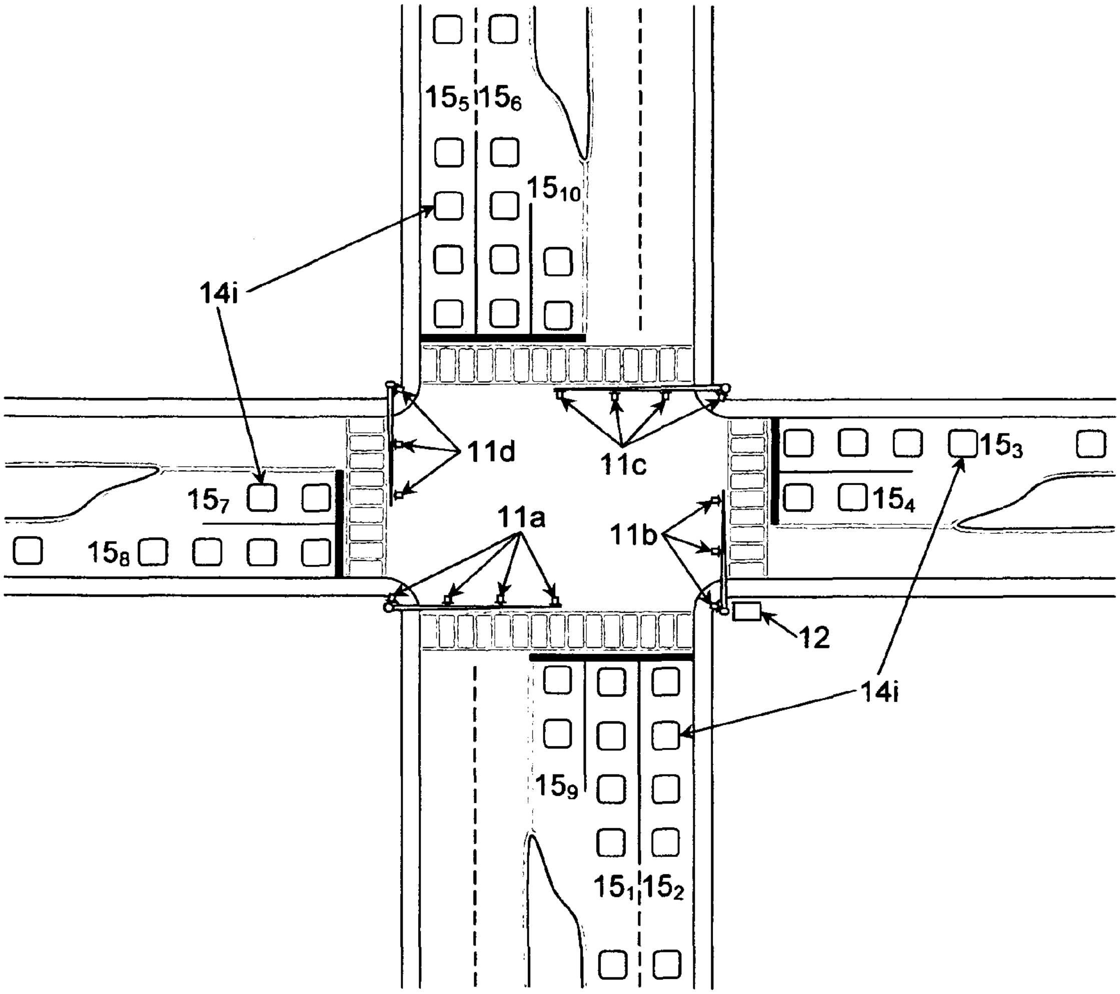
FIG. 1 is a schematic aerial view of a controlled 4-way intersection.

Turning now to the drawings, FIG. 1 is a schematic aerial view of a controlled 4-way vehicle traffic intersection. The intersection is provided with four sets of control heads 11*a*-11*d* each containing the usual traffic lights for providing red, amber and green traffic control signals for oncoming vehicles. The operation of each set of control heads is under the supervision of a standard traffic controller 12 mounted in a cabinet located at a convenient intersection location. The traffic controller 12 has a plurality of output circuits for driving the individual traffic lights comprising each set of control heads 11*a*-11*d*. A plurality of vehicle detectors (not illustrated) is located in the same cabinet as traffic controller 12 and each vehicle detector provides motorized vehicle and bicycle CALL signals to traffic controller 12 in the manner described below, along with timing signals for INITIAL TIME and EXTENSION TIME described more fully below. Each vehicle detector is coupled to one or more vehicle detector loops 14*i* located in the various lanes leading to the intersection. Some of the loops 14*i* are located in through-only lanes-such as lanes 15-1-15-8; other loops are located in left turn only lanes-such as lanes 15-7, 15-9. It is understood that the intersection depicted in FIG. 1 is by way of example only, and that other intersections having different lane configurations are contemplated. What is essential is the inclusion of at least one vehicle detector loop in any lane having a corresponding control head.

In any given lane at any given time, a motorized vehicle or a bicycle may pass over the vehicle detector loops in that lane. Each such vehicle and bicycle is detected by the corresponding vehicle detector for that lane so that the appropriate control signals can be furnished to the intersection traffic controller 12.

Figure 2:
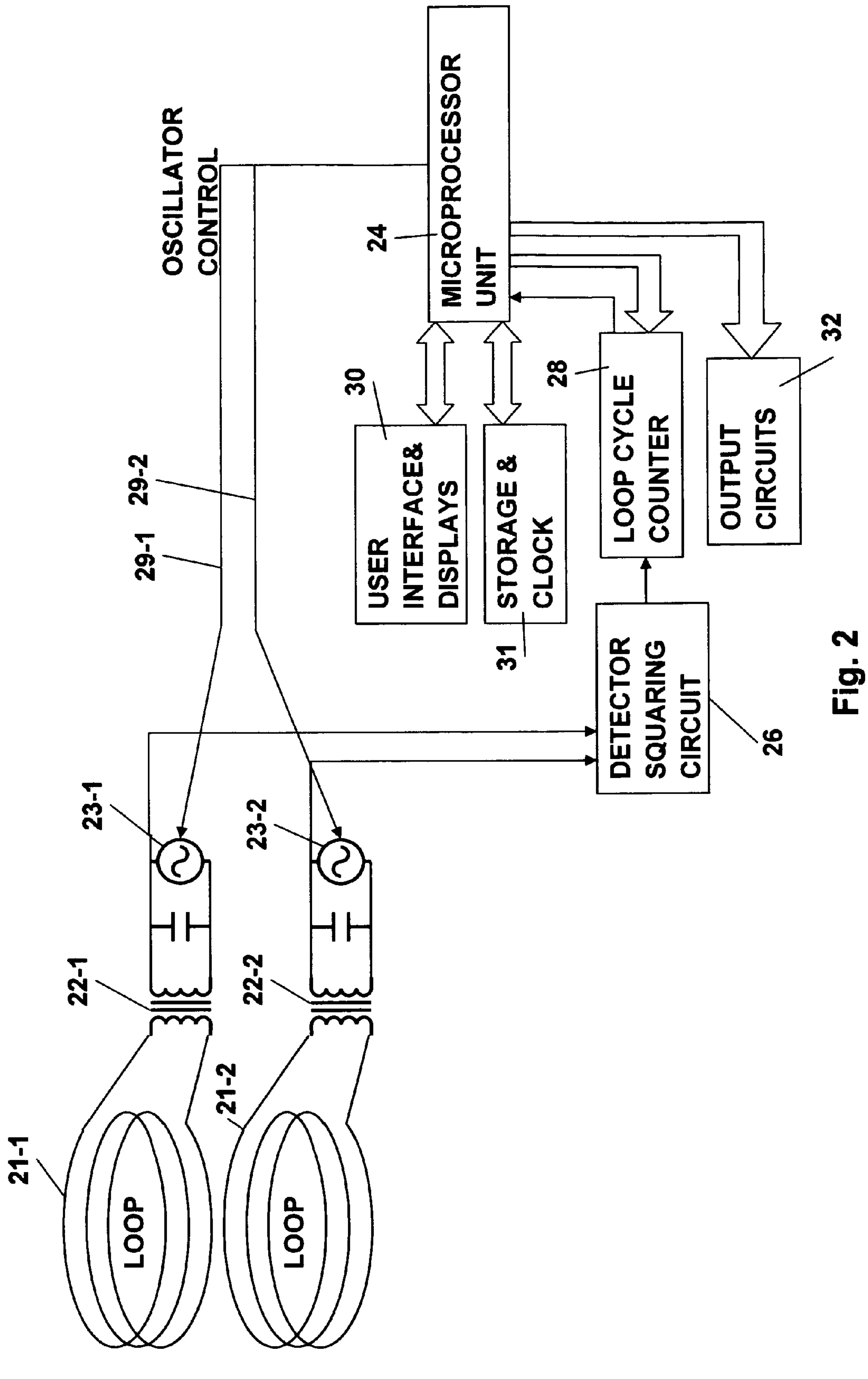
FIG. 2 is a block diagram of an embodiment of a vehicle detector with bicycle detection capability.
Figure 3:
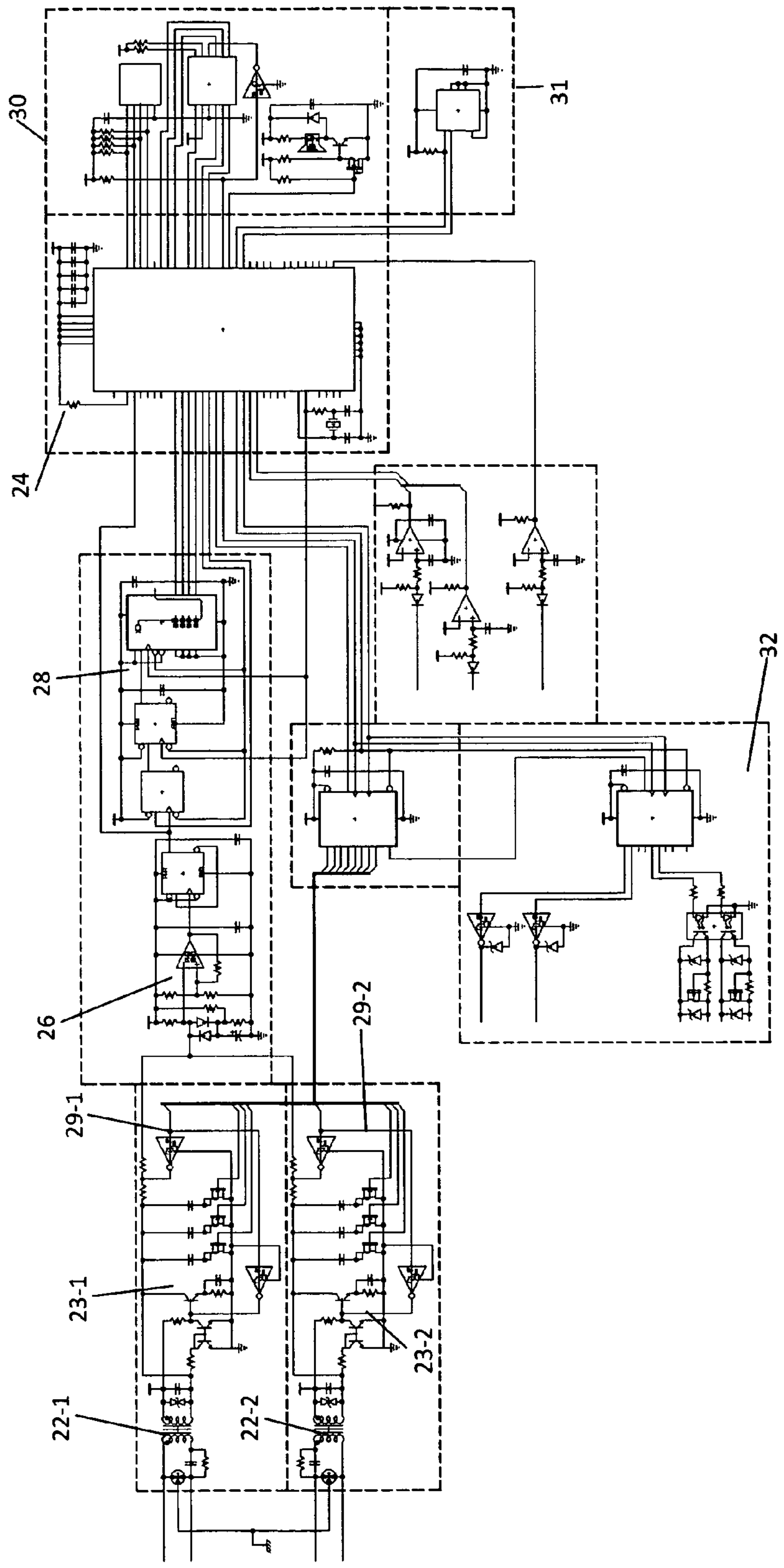
FIG. 3 is a circuit diagram of the specific embodiment of the vehicle detector illustrated in block diagram form in FIG. 2.

FIG. 2 is a block diagram of a preferred embodiment of a two channel vehicle detector having bicycle detection capability incorporating the invention, while FIG. 3 is a circuit diagram of the specific embodiment of the vehicle detector illustrated in block diagram form in FIG. 2. While FIGS. 2 and 3 illustrate only two channels, it is understood that the number of channels may be greater than two: Consequently, where appropriate the elements described below are referenced with the designation "i", where T is an integer. As seen in FIG. 2, each loop antenna 21*i* is coupled via an isolation transformer 22*i* to an oscillator 23*i* having a plurality of capacitors (only one illustrated in FIG. 2—multiple capacitors illustrated in FIG. 3) for setting the nominal frequency of the oscillator 23*i*. As seen in FIG. 3, in the preferred embodiment three of the capacitors are selectable by means of FET switches under control of a microprocessor 24. Microprocessor 24 is preferably a type 17C756A unit available from Microchip Technology, Inc of Chandler, Ariz. USA. The operational state of each oscillator 23*i* is controlled by a control signal generated by microprocessor unit 24 on a dedicated control line 29*i*: when at a first voltage level the control signal present on control line 29*i* turns on the corresponding oscillator 23*i*; when at a second voltage level the control signal present on dedicated control line 29*i* turns off the corresponding oscillator 23*i*. The frequency of each oscillator 23*i* is dependent in part upon the inductance presented thereto, which is dependent in part upon the presence or absence of a motorized vehicle or bicycle in the vicinity of the corresponding loop antenna 21*i*. The output of each oscillator 23*i* is coupled to a detector signal squaring circuit 26, the output of which is coupled to the input of a loop cycle counter 28. Loop cycle counter 28 is implemented in microprocessor 24 using a portion of the computer program listed in the computer program appendix.

In operation in the vehicle detector mode, each oscillator 23*i*, which typically operates in the range from about 20 kHZ to about 100 kHZ, produces a periodic signal in the circuit containing the corresponding loop antenna 21*i*. A second oscillator implemented in microprocessor 24 operating at a much higher frequency generates a sample count signal over a fixed number of loop cycles which are counted by the loop cycle counter 28. The relatively high frequency count signal is typically used to increment a counter configured in microprocessor 24, which stores a number corresponding to the sample count at the end of the fixed number of loop cycles. This sample count is compared with a reference count stored in another counter configured in microprocessor 24 and representative of a previous count in order to determine whether a motorized vehicle or a bicycle has entered or departed the region of the corresponding loop 21*i* in the time period between the previous sample count and the present sample count.

The initial reference value is obtained from one or more initial sample counts and stored in a reference counter. Thereafter, successive sample counts are obtained on a periodic basis, and compared with the reference count. If the two values are essentially equal, the condition of the loop 11*i* remains unchanged, i.e., a motorized vehicle or bicycle has not entered or departed the corresponding loop 21*i*. However, if the two numbers differ by at least a threshold amount in a first direction (termed the Call direction), the condition of the corresponding loop 21*i* has changed and may signify that a motorized vehicle or bicycle has entered the corresponding loop 21*i*. More specifically, in a system in which the sample count has decreased and the sample count has a numerical value less than the reference count by at least a threshold magnitude, this change signifies that the period of the loop signal has decreased (since fewer counts were accumulated during the fixed number of loop cycles), which in turn indicates that the frequency of the loop signal has increased, usually due to the presence of a motorized vehicle or bicycle in or near the corresponding loop 21*i*. When these conditions exist, the vehicle detector generates a signal termed a Call signal indicating the presence of a motorized vehicle or a bicycle in the loop 21*i*, and this signal is coupled to the traffic controller 12 via the output circuits block 32.

Correspondingly, if the difference between a sample count and the reference count is less than a second threshold amount, this condition indicates that a motorized vehicle or bicycle which was formerly located in or near the loop 21*i* has departed the detection zone. When this condition occurs, a previously generated Call signal is dropped.

Bicycle detection is provided according to the invention using one of two different techniques. In a first technique, a maximum bicycle threshold value Bmax stored in the microprocessor memory is examined whenever a vehicle has been detected by the vehicle detector. If the maximum value of the measured $-\Delta L/L$ is less than Bmax but greater than a minimum threshold greater than zero (0.001% in the preferred embodiment), the vehicle is identified as a bicycle. If the maximum value of the measured $-\Delta L/L$ is equal to or greater than Bmax, the vehicle is identified as a motorized vehicle (i.e., a vehicle other than a bicycle). In the preferred embodiment, the value of Bmax is 0.7%, which has been empirically determined to be an accurate value for Bmax.

Figure 4A:
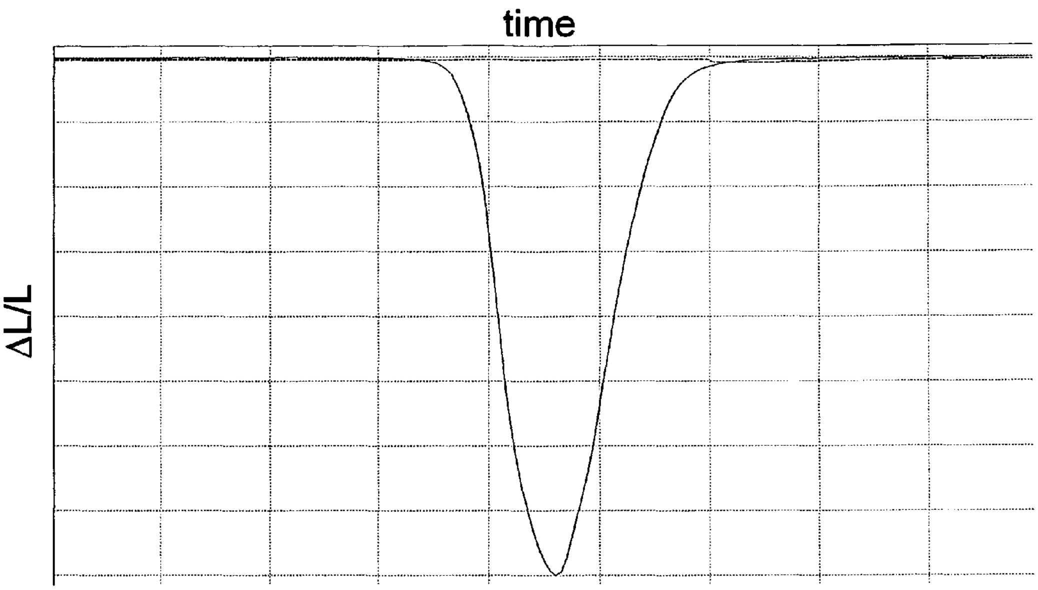
FIGS. 4A and 4B are graphs illustrating the signatures of a motorized vehicle (FIG. 4A) and a bicycle (FIG. 4B passing over a vehicle detector loop.
Figure 4B:
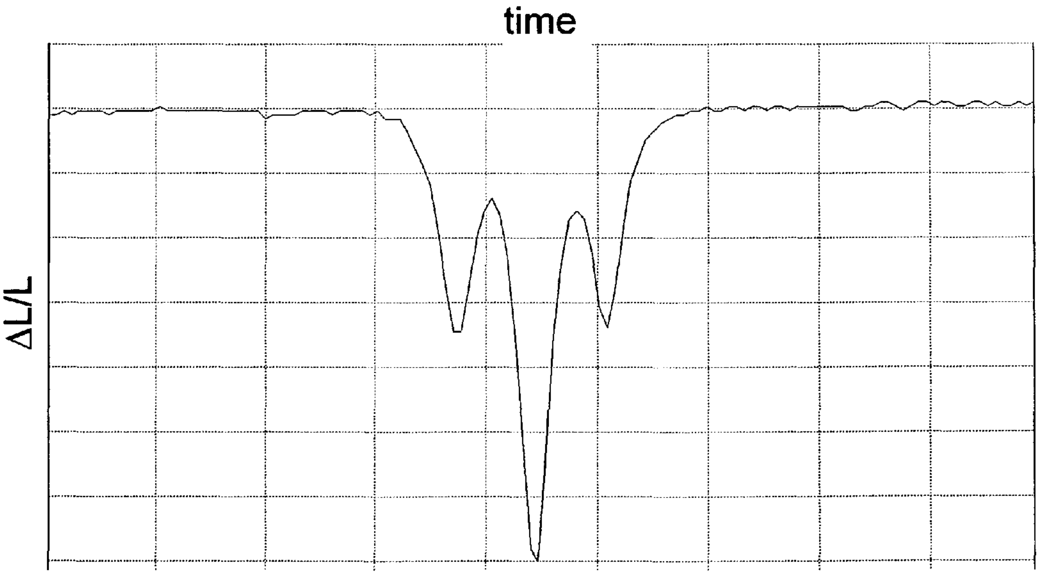

In a second bicycle detection technique, a signature analysis is performed using the $-\Delta L/L$ values obtained during the vehicle detection process. This is illustrated in FIGS. 4A and 4B. FIG. 4A is a plot of the measured values of $-\Delta L/L$ (Y-axis) over a period of time (X-axis) for a motorized vehicle passing over a loop 22*i*. As is evident from this Fig., the plot has a single lobe which is nearly symmetric. FIG. 4B is a plot of the measured values of $-\Delta L/L$ over a period of time for a standard bicycle passing over the same loop 22*i*. As is evident from this Fig., the plot has a central large lobe flanked by two smaller lobes. The difference in shapes between the two plots provides sufficient information to distinguish between a motorized vehicle and a standard bicycle.

During installation of a vehicle detector incorporating the invention at an intersection such as that depicted in FIG. 1, the installation technician will normally perform an initial set up using push switches and displays incorporated into element 30 of the vehicle detector (FIG. 2). Element 30 is described in detail in the above-referenced '964 U.S. Patent and includes push button switches, and an LCD display having seven segment characters, a bar graph, and special symbols. The purpose of the initial set up is to tailor the operation of the vehicle detector to the particular requirements of a given intersection, such as the particular vehicular lanes for which bicycle detection is necessary or desirable, the vehicular lanes for which bicycle detection is not needed (if any), the duration of the clearance time deemed desirable for a given lane at the intersection, and other vehicle control parameters. The vehicle detector is supplied with factory default settings as noted more particularly below. The following is a description of the operating instructions, including the initial set up procedure.

Operating Instructions

I. General Description:

The vehicle detector is designed to detect all vehicles with the added ability of differentiating bicycles from all other vehicles. This allows the traffic engineer to detect and provide safe passage time for bicycles without compromising the intersection's operating efficiency. The unique capability to identify bicycles from other vehicles allows the user to program initial time and extension time for bicycles only, thus providing a safe passage time through the intersection. When a bicycle is detected passing through the bicycle loop (a single 40 ft square loop or smaller) the channel's output is latched in the call state. The call output is only latched during the absence of phase green. The latched call is held until the detector's phase green input becomes active. At the time the phase green input becomes active the latch is reset, the call is held, and the initial time, which has been programmed in the detector, begins counting down to zero. If the loop is vacant when the initial time reaches zero the call is dropped. If additional bicycles are detected before the initial time reaches zero each subsequent bicycle extends the call by either the remaining amount of initial time or the extension time, whichever is greater. During phase green, after the initial time expires, all bicycle calls are extended by the amount of the programmed extension time. When the extension time is set to zero the extension time defaults to the initial time value. If it is desired to provide an extension time different from the initial time the detector's extension time can be programmed for any value ranging from 0.1 seconds to 25.5 seconds. When the extension time is set to any value other than zero the detector provides the initial time plus a separate extension time during phase green. The detector's latched call, initial time, and extension time respond only to bicycles. For alt other vehicles the detector functions as a standard presence detector without timing.

The detector can also be set for Bicycle Detect Only Mode. In the Bicycle Detect Only Mode the detector does not output call signals for other vehicles passing over the bicycle detection loop.

II. Factory Default Settings:

| Function | Channel 1 | Channel 2 |
|---|---|---|
| Loop Frequency: 8 Operating Frequencies | 3 | 7 |
| Sensitivity: Off - 1 to 9 - Call | 7 | 7 |
| Delay Time: 0-255 seconds | 0 | 0 |
| Extension Time: 0-25.5 seconds | 0.0 | 0.0 |
| Bicycle Initial Time: OFF*, 1-999 seconds | 15 | 15 |
| Option 1: L (Loop Inductance) | OFF (all channels) | |
| Option 2: $-\Delta L/L$ (% Inductance Change) | OFF (all channels) | |
| Option 11 : Audible Detect (Buzzer) | OFF | OFF |
| Option 15.0: Bicycle Detect Only | OFF | OFF |
| Option 15.1: Phase Green Input Disable** | OFF | OFF |

*WARNING: When the Bicycle Initial Timer is OFF, the channel operates as a standard detector.

**WARNING: When Option 15.1 is turned "ON", there will not be any initial time. The programmed initial time value becomes extension time value. The extension time starts counting down immediately when the bicycle leaves the loop area.

The following table is from CALTRANS Policy Directive TR-0011 (Rev September 2009) issued on Aug. 29, 2007.

Please consult the local agency regulations for the time required to allow a bicycle to safely cross the intersection.

The following table defines the minimum phase time to allow a 6 foot long bicycle to clear the last conflicting lane. The time is defined by a bicycle start up time of 6 seconds and constant velocity of 14.7 feet/second. The time is calculated using the formula below:

Where: W (feet)=Distance from stop bar to far side of last $$\text{Minimum phase time (seconds)} \geq 6 \text{ seconds} + (W+6 \text{ feet}) \div (14.7 \text{ feet/second})$$

Bicycle initial time is calculated as follows: (B=Bicycle initial time)

Minimum phase time=B+Yellow clearance interval (Y)+Red clearance (R)

TABLE

| Distance from stop bar to far side of last conflicting lane (Feet) | Minimum phase time B + Y + R (Seconds) |
|---|---|
| 40 | 9.1 |
| 50 | 9.8 |
| 60 | 10.5 |
| 70 | 11.2 |
| 80 | 11.9 |
| 90 | 12.5 |
| 100 | 13.2 |
| 110 | 13.9 |
| 120 | 14.6 |
| 130 | 15.3 |
| 140 | 15.9 |
| 150 | 16.6 |
| 160 | 17.3 |
| 170 | 18.0 |
| 180 | 18.7 |

Note: Y and R are programmed in the controller

III. How to View and Program Detector Functions:

Enter the PROGRAM mode by momentarily pressing the FUNC pushbutton. Use the FUNC pushbutton to step through the functions described below.

Press the CHAN pushbutton to select the channel. The channel that is in PROGRAM mode is indicated by a flashing numbered-loop symbol at the bottom of the LCD.

To change a function's setting or to toggle a function ON or OFF, press the ▲ (UP) or ▼ (DOWN).

To exit the PROGRAM mode and return to the NORMAL mode, press and hold the CHAN pushbutton continuously for one second.

Loop Frequency

Press the ▲ (UP) or ▼ (DOWN) pushbuttons to change the programmed loop frequency. The filled segment on the bar graph indicates the setting. The left-most segment represents setting 1 and the right-most segment represents setting 8. The LCD displays the actual loop operating frequency. A separation of at least 5 KHz for adjacent loops, not connected to the same detector, is recommended. NOTE: Changing the frequency will reset the detector channel. Care should be taken to ensure that the detector channel is not reset while the detection zone is occupied.

Sensitivity

Press the ▲ (UP) or ▼ (DOWN) pushbuttons to change the programmed sensitivity. The lowest Sensitivity Level is "1" and the highest Sensitivity Level is "9". The channel can be configured to place a permanent call by selecting CALL (one setting above Sensitivity Level "9"). The channel can be disabled by selecting OFF (one setting below Sensitivity Level "1"). When CALL or OFF is selected, the LCD flashes the message CALL or OFF during NORMAL DISPLAY mode. NOTE: Changing the sensitivity will reset the detector channel. Care should be taken to ensure that the detector channel is not reset while the detection zone is occupied.

Delay Time

Delay Time can be adjusted from 0 to 255 seconds by pressing the ▲ (UP) or ▼ (DOWN) pushbuttons. When the Call Delay Time is 0, pressing the DOWN pushbutton steps the value to 255 seconds. Holding either the ▲ (UP) or ▼ (DOWN) buttons will increase the speed of change. When the Call Delay Time is 255 seconds, pressing the UP pushbutton steps the value to 0. During the DELAY PERIOD, the channel's LED flashes at a four Hz rate with a 50% duty cycle and the LCD shows a countdown of the Call Delay Time. When the Phase Green Input is active the Call Delay Time is inhibited.

Extension Time

Extension Time can be set from 0.0 to 25.5 seconds by pressing the ▲ (UP) or ▼ (DOWN) pushbuttons. When the Call Extension Time is 0.0, pressing the DOWN pushbutton steps the value to 25.5 seconds. When the Call Extension Time is 25.5 seconds, pressing the UP pushbutton steps the value to 0.0. Holding either the ▲ (UP) or ▼ (DOWN) buttons will increase the speed of change. During the EXTENSION PERIOD, the channel's LED flashes at a 16 Hz rate with a 50% duty cycle and the LCD shows a countdown of the Extension Time.

Extension Time provides extension time for only bicycles. If a bicycle is detected while Bicycle Initial Time is counting down, the Call continues until both initial time and extension time reaches zero. Additional bicycles detected while the phase green is active will extend the detection by the Extension Time value. The Extension Time should be set for the time it takes a bicycle to safely cross the intersection.

Bicycle Initial Time

When in the program mode the Bicycle Initial Time will flash between "bcL" and "OFF" or "bcL" and "XXX" (programmed time). The timer can be adjusted from OFF to 999 seconds by pressing the ▲ (UP) or ▼ (DOWN) pushbuttons. When the time is set to OFF, pressing the DOWN pushbutton steps the value to 999 seconds. Holding either the ▲ (UP) or ▼ (DOWN) buttons will increase the speed of change. When set to OFF the detector channel operates as a standard detector.

In normal operation "bc" is displayed on the LCD for each channel with Bicycle Initial Time programmed. When a bicycle passes through the bicycle loop area, the bicycle detection latches the call output. When Option 15.1 is OFF, the Bicycle Initial Time starts to count down when the phase green input becomes active. When Option 15.1 is ON there will not be any Initial Time. The programmed Initial Time will be Extension Time. The Extension Time starts to count down immediately when the bicycle leaves the loop area. When the timer reaches zero and the loop is vacant the call is dropped. When the Extension Time is programmed to zero the Bicycle Initial Time value becomes the default Extension Time value. If Extension Time is programmed it will extend each bicycle detection by the extension time value.

The Extension Time should be set for the time it takes a bicycle to safely cross the intersection.

Option 1: Loop Inductance

Pressing either the ▲ (UP) or ▼ (DOWN) pushbuttons toggles between ON and OFF. When Option 1 is OFF the LCD indicates three dashed lines (- - -) during the No Call state. When Option 1 is ON the LCD continuously indicates the Loop Inductance value in microhenries while in the NORMAL DISPLAY mode. Option 1 automatically turns OFF 15 minutes after the last actuation of any of the four front panel pushbutton switches. The display shows three digits if the inductance is between 15 μH and 999 μH. If the inductance is greater than 999 μH, the display alternately flashes between 1 or 2 and the lower three digits. The four digits represent inductance values from 1000 μH to 2500 μH. When a vehicle is detected the Detect LED and bar graph display indicate the call. The count down of the Delay, Extension, and Bicycle Initial timers is not displayed when Option 1 is ON. NOTE: Turning this option ON for any channel turns it ON for all channels.

Option 2: Inductance Change −ΔL/L

Pressing either the ▲ (UP) or ▼ (DOWN) pushbuttons toggles between ON and OFF. When Option 2 is OFF the LCD indicates a steady Call when a vehicle is detected. When Option 2 is ON the LCD indicates the −ΔL/L value when a vehicle is detected. The maximum −ΔL/L that occurs is displayed for two seconds unless a greater change occurs. NOTE: Turning this option ON for any channel turns it ON for all channels.

Option 11: Audible Detect Signal

Pressing either the ▲ (UP) or ▼ (DOWN) pushbuttons toggles between ON and OFF. When Option 11 is OFF the Audible Detect Signal is disabled. When Option 11 is ON for a channel an audible signal is emitted when the channel's detection zone is occupied by any bicycle or other vehicle, regardless of Delay or Extension timing. This option can only be turned ON for one channel at a time. The last channel to have Option 11 turned ON will be the only channel with Option 11 turned ON. Following the last switch actuation Option 11 automatically turns off after 15 minutes.

Option 15.0: Bicycle Detect Only

Pressing either the Δ (UP) or ∇ (DOWN) pushbuttons toggles Option 15.0 between ON and OFF. When Option 95.0 is turned OFF the channel provides a call output for all vehicles. When Option 15.0 is turned ON "bcO" is displayed on the LCD. When Option 15.0 is turned ON the channel will only provide a call output for bicycles. Larger vehicles do not provide a call output.

Option 15.1: Phase Green Input Disable

Pressing either the Δ(UP) or ∇ (DOWN) pushbuttons toggles Option 15.1 between ON and OFF. When Option 15.1 is turned OFF the channel begins counting down the Bicycle Initial Time at the time the Phase Green Input becomes active. When Option 15.1 is turned ON the Initial Time is disabled. Any programmed Initial Time functions as Extension Time. The Extension Time starts to count down immediately when the bicycle leaves the loop area.

Loop Fail

The number of loop failures logged in the loop fail register is displayed on the LCD. Any time a channel enters the Fail Safe Mode due to a loop failure, the loop fail register is incremented by one count. When in the Loop Fail view mode pressing either the Δ (UP) or ∇ (DOWN) pushbuttons clears the loop fail register. The number of loop fail counts is reset to zero whenever power is lost or the channel is reset. The loop fail register is not reset when the channel's sensitivity or frequency is changed.

After each detector channel is initialized and operating in a normal manner, the channel is continuously monitored for faulty loop conditions (e.g. broken wires, poor splices, bad solder connections, etc.). If the measured loop inductance value rapidly changes by more than ±25%, the channel is considered to have failed. The channel then enters the Fail Safe Mode, which generates a constant call output. When a channel is in Fail Safe Mode the Loop Fail message located at the bottom of the LCD will be illuminated. The LCD displays L lo for shorted or low loop inductance values, The LCD displays L hi for open or high loop inductance values. In addition, the corresponding channel's LED will begin to emit a flashing pattern (three flashes per second). However, if the detector is reset, or power is momentarily lost, the detector will retune if the loop inductance is within the acceptable range. If any type of loop failure occurs in one (or more) loop(s) in a group of two or more loops wired in parallel, the detector will not respond with a Fail-Safe output following any type of reset. It is essential that multiple loops wired to a common detector channel are wired in series to ensure Fail-Safe operation under all circumstances. If the loop self-heals the detector and LCD resume normal operation. The LED continues to flash as a means of indicating a prior loop fail condition until the loop fail register is cleared.

Firmware Version

The firmware version and revision for the detector is displayed on the LCD. The display alternates between the model letter and firmware version (example E36) and the firmware revision number (example 0.00).

IV. How to Reset the Detector:

Momentarily press the CHAN pushbutton to select either channel 1 or channel 2. Press and hold the CHAN pushbutton continuously for three (3) seconds. After three seconds the channel is reset maintaining all previous settings.

Changing the frequency or sensitivity setting will enter the new setting and reset the channel. Changing any of the other parameter values takes effect immediately without resetting the detector channel. Simply entering the program mode without changing any parameter will not reset the channel.

Pressing and holding all four pushbuttons simultaneously and continuously for five (5) seconds resets both channels and restores the factory default settings.

The detector can be reset by removing and reapplying power.

Loop Fail History is cleared by all reset procedures described above except changing frequency or sensitivity. Pressing either the ▲ (UP) or ▼ (DOWN) pushbuttons while viewing the Loop Fail History also clears the Loop Fail History.

V. Sensitivity Setting:

Sensitivity is controlled by selecting the Sensitivity Level for each channel. The recommended sensitivity setting for bicycles is "7", which is the factory default setting. Sensitivity settings of "1" through "9" represent thresholds from the least sensitive to the most sensitive. Setting the proper sensitivity level for the bicycle detector is essential for reliable detection.

The LCD includes an eight (8) segment bar graph that provides a representation of the relative change of inductance as seen by the detector. The first (left-most) bar graph segment represents the minimum inductance change necessary for the detector to output a call. Larger inductance changes are indicated by more segments. Each segment on the display is equal to one sensitivity level.

BICYCLE DETECTION requires adjusting the sensitivity to the proper setting. The bar graph can be used to assist in setting the proper sensitivity level. Adjust the sensitivity level for the channel until seven (7) segments of the bar graph are shaded when a standard automobile is present in the loop zone. Bring a bicycle down the center of the loop. If the bar graph shows more than two (2) segments, reduce the sensitivity level by the number of segments above two (2). If the bicycle is not detected when moving through the center of the loop, increase the sensitivity until the bicycle causes the shading of at least one (1) segment of the bar graph. Important: A bicycle will cause about 10 to 20 times more change when riding over the loop wires parallel to the direction of travel than riding in the center of the loop (for a 6'×6' loop).

Bicycle Loop Geometry Recommendations

The bicycle detector is capable of detecting bicycles on many small loop geometries. The recommended loop area should not exceed 40 square feet. The bicycle loop requires a dedicated lead-in cable connected to the loop input on the bicycle detector. The bicycle must pass through the bicycle detector loop area. The preferred location for the loop is approximately 15 feet behind the stop bar.

The optimum bicycle loop geometry is a four-turn parallelogram. The two shorter sides of the parallelogram loop are each forty-two inches long and each shorter side should be two feet from the respectively adjacent lane line. The parallelogram long loop sides are arranged at a forty-five degree angle with respect to the direction of travel along the lane. The junction of the long parallelogram loop side and the short parallelogram loop side which is closest to the stop bar is located approximately fifteen feet from the stop bar.

The detector sensitivity level should be initially set to level “7”. Verify bicycles are detected when traveling through the loop. Verify automobiles are not detected when traveling 2 or more feet from the 42 inch side of the loop.

When using an existing (four) 6'×6' loop configuration (square or round), the second loop from the stop bar should be isolated and designated as the bicycle loop. The bicycle loop requires a dedicated lead-in cable connected to the loop input on the bicycle detector.

Recommended Loops

The PLB Preformed Loop or PLH Preformed Loop available from Reno A&E, Reno, Nev. can be configured as a 42 inch parallelogram bicycle loop. The PLB Preformed Loop is constructed using 0.23" XLPE cable and is designed for installation in a ¼ inch saw cut. The design provides for adjustment of the loop cable to adapt to small variations in the perimeter of the saw cut. There is no need for 45 degree corner cuts. Remove sharp inside corners of the saw cut with a small chisel to protect the loop cable from damage. The lead-in cable is 0.23" OD and can be supplied in any length necessary to provide a continuous run to the traffic cabinet without the need for splicing a separate lead-in cable.

The PLH Preformed Loop is constructed using 0.375" XLPE cable and is designed to be overlaid with asphalt or embedded in concrete.

Accurate bicycle detection and discrimination requires the ability for the vehicle detector to respond to extremely small changes in the inductive loop’s electrical field. This requirement dictates that both the inductive loop and the electronic processing circuits are capable of operating in a stable manner.

Traditionally, Inductive loops have been installed in the pavement by saw cutting the pavement, wrapping a single conductor of insulated electrical wire in the saw cut slot, and filling the slot with a sealer such as crack sealant. The harsh environment of the pavement coupled with inferior insulation has been the source of loop failures for many years. As detection performance requirements have increased, problems with operational stability and reliability have also increased. One problem in operational stability results from movement of adjacent wires in the saw slot, which causes small changes in the value of the electrical field. A second problem results from water entering the slot, changing the electrical characteristics, which causes small changes in the electrical field. Small changes in the electrical field caused by the presence of a bicycle cannot be reliably be distinguished from small changes in the electrical field caused by environmental changes.

The use of high quality pre-formed loops eliminates these problems and significantly improves reliability and performance. High quality pre-formed loops are fabricated using a multi-conductor cable constructed with XLPE (cross linked polyethylene) insulation. XLPE insulation withstands temperatures of over 400 degrees Fahrenheit providing excellent resistance to damage from pavement movement. Another advantage is provided by the incorporation of a water block material under the outer jacket encapsulating the wires, thus eliminating the possibility of water migrating between the wires. An additional benefit is afforded by the use of the use of a single multi-conductor cable which also adds strength by bundling all the separate wires into a single cable. Over the past ten years high quality pre-formed loops have eliminated loop failures.

Figure 5A:
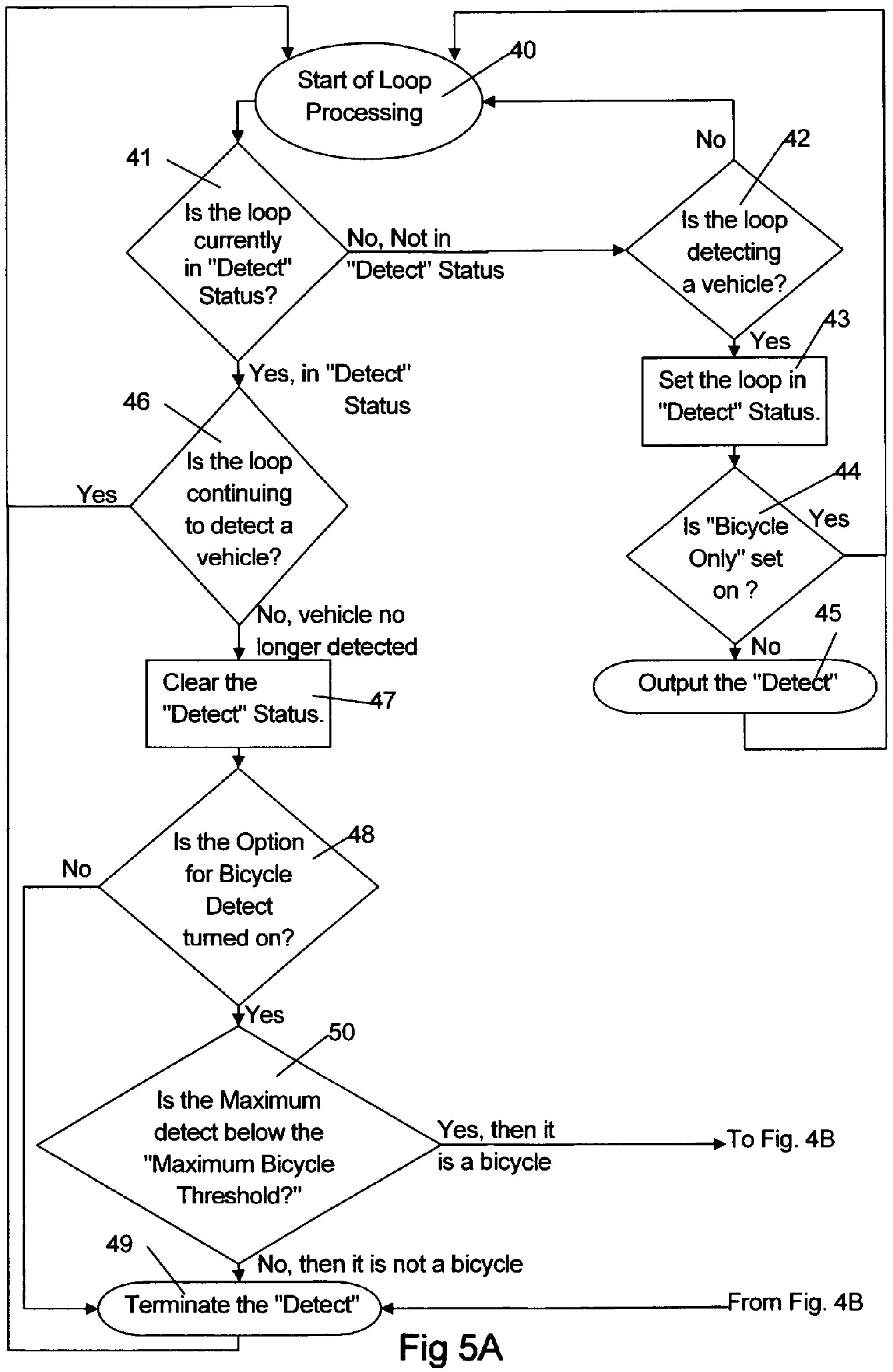
FIGS. 5A and 5B together comprise a flow diagram illustrating the operation of the vehicle detector illustrated in block diagram form in FIG. 2 when configured to detect bicycles using a banded threshold technique.
Figure 5B:
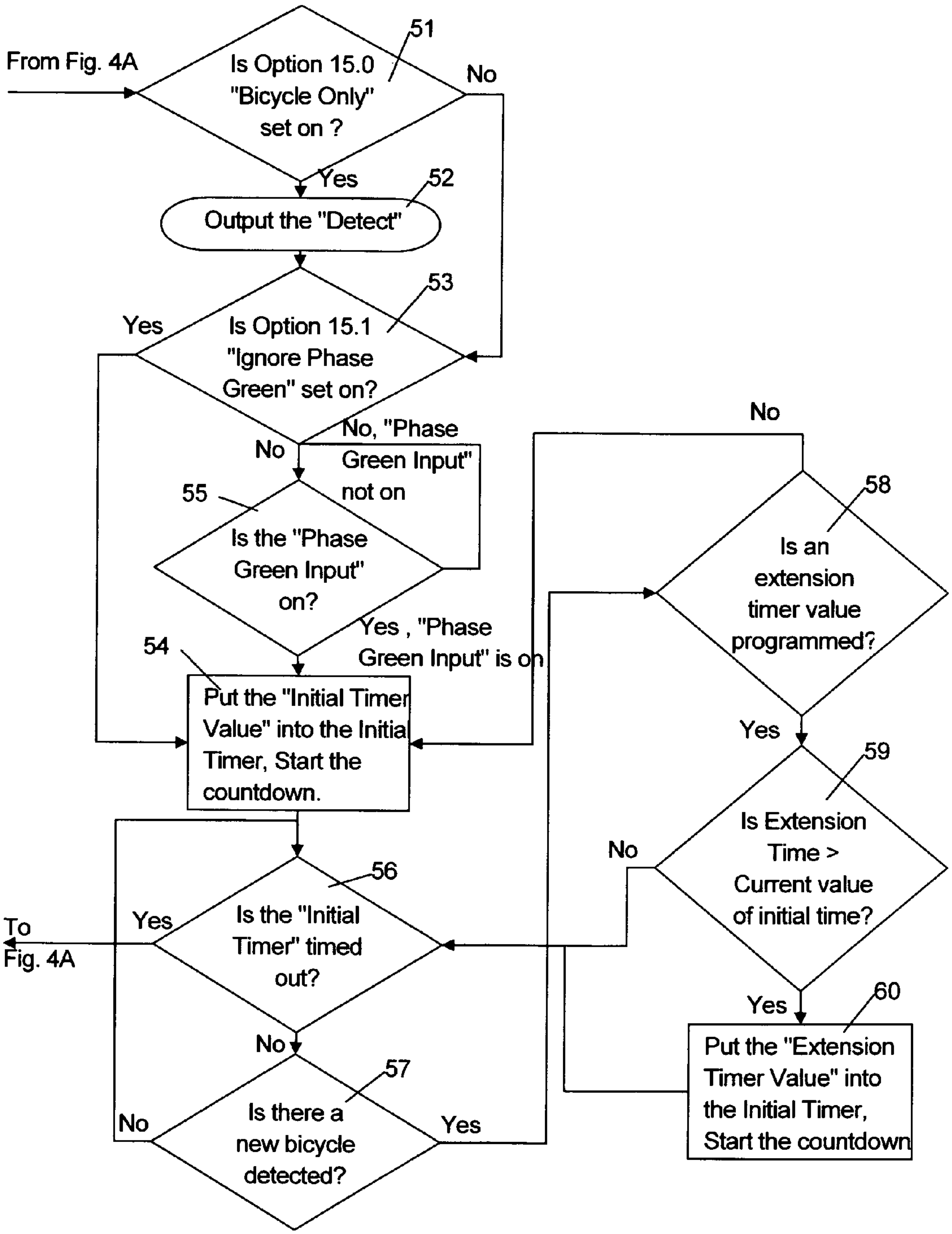

After initial set up, the vehicle detector shown in FIGS. 2 and 3 is operated under direction of the program listed in the accompanying appendix and stored in storage and clock unit 31. The flow diagram in FIGS. 5A and 5B illustrates the loop processing routine for the maximum bicycle threshold value technique described above performed by microprocessor 24 after start-up and initial processing. Initially, in step 41 the state of the loop is examined to determine whether or not the loop is in the Detect status, ie. whether or not a vehicle is currently being detected in the loop. If No, the routine proceeds to step 42 and the state of the loop is examined to determine whether or not the loop is currently detecting a vehicle. If No, the routine returns to step 40—Start of Loop Processing. If Yes, the routine proceeds to step 43 and the loop is set in Detect status. The routine then proceeds to step 44 and the detector mode is examined to determine whether or not the Bicycle Only mode has been selected. In Bicycle Only mode, only a bicycle will be detected in a given loop using the Bicycle Detect algorithm described above. If Yes, the routine returns to step 40. If No, the routine proceeds to step 45 during which the Detect is output—i.e., a Call signal is generated.

If the result of the examination in step 41 is Yes, the routine proceeds to step 46 and the state of the loop is examined to determine whether the loop is continuing to detect a vehicle. If Yes, the routine proceeds back to step 40—Start of Loop Processing. If No, the routine proceeds to step 47 during which the Detect status is cleared. After step 47, the routine proceeds to step 48 and the Initial timer contents are examined to determine whether or not the Bicycle Detect option is turned on, signified by a non-zero value set in the Initial timer. If No, the routine proceeds to step 49 where the Detect is terminated and the Call signal is dropped. After step 49, the routine returns to step 40.

If the result of the step 48 processing is Yes, the routine proceeds to step 50 where the Maximum value of the measured quantity of $\Delta L/L$ is compared to the predetermined Maximum Bicycle threshold, which is 0.7% in the preferred embodiment. If No, the routine proceeds to step 49. If yes, the routine proceeds to step 51 (FIG. 5B). In step 51 the detector mode is examined to determine whether or not the Bicycle Only option is turned on. If No, the routine proceeds to step 53. If Yes, the routine proceeds to step 52 where the Detect is output—i.e., a Call signal is generated. The routine then proceeds to step 53.

In step 53, the detector mode is examined to determine whether or not the Ignore Phase Green option is turned on. If Yes, the routine proceeds directly to step 54. If No, the routine proceeds to step 55 where the state of the Phase Green input signal is examined. If the Phase Green input signal is not active, the routine loops back to the beginning of step 55 until the Phase Green input signal becomes active. When the Phase Green input signal becomes active the routine proceeds to step 54 where the programmed initial timer value is set into the Initial timer and a countdown of the initial timer is commenced. The routine then proceeds to step 56 during which the Initial timer is monitored to determine whether the Initial timer has timed out (counted down to a zero value). If Yes, the routine proceeds to step 49 (FIG. 5A) where the Detect is terminated, after which the routine proceeds back to initial step 40. If No, the routine proceeds to step 57 during which the detector is examined to determine whether another bicycle has been detected. If No, the routine returns to the beginning of step 56. If Yes, the routine proceeds to step 58 during which a check is made to determine whether or not an extension timer value has been programmed into the detector. If No, the routine returns to step 54 where the programmed Initial timer value is set into the Initial timer and countdown starts anew. If Yes, the routine proceeds to step 59 where the value of the extension timer is compared to the value remaining in the Initial timer. If the extension timer value is greater than the current value in the Initial timer, the routine proceeds to step 60 where the extension timer value is set into the Initial timer, after which the routine returns to step 56. If the extension timer value is not greater than the current value in the Initial timer, the routine returns to step 56 where the initial timer countdown is permitted to continue.

To implement the signature analysis technique for bicycle detection, the flow diagram of FIGS. 5A and 5B is modified by changing step 50 to perform the signature analysis routine described above.

As will now be apparent, vehicle detectors incorporating the invention provide a bicycle detect and discrimination capability as well as a motorized vehicle detection capability. When Bicycle Detect mode has been selected by setting a non-zero value into the Initial timer and a bicycle is detected, a different clearance time is provided which is of sufficient length to enable a bicycle to proceed safely through an intersection. The length of this bicycle clearance time can be selected by the technician at the intersection to match the physical configuration of the intersection. Bicycle detection can be selectively enabled for each loop controlled by a vehicle detector by entering a non-zero Initial time value into the vehicle detector for a given channel controlled by the vehicle detector. If no such value is entered for a given channel, the vehicle detector operates that channel as a standard motorized vehicle detector. In addition, a given channel may be configured to operate in a bicycle only detect mode by activating Option 15.0 so that only bicycles will be detected by that channel. This mode is useful in installations where it is desirable to count the number of bicycles in a given lane where both bicycles and motorized vehicles are permitted. It is also useful in counting the number of bicycles in a bicycle only lane. When configured to operate in bicycle detect or bicycle only detect modes, the vehicle detector provides additional clearance time for successive bicycles which arrive at the loop(s) controlled by that vehicle detector, the additional clearance time being supplied by either an extension time selected by the operator or the remaining Initial time in the initial timer during count down, whichever time value is greater.

While the invention has been described with reference to a vehicle detector incorporating the functions of establishing the Initial Timer and Extension Time values and using these values to process the duration of the clearance interval and supply this control information to the associated traffic controller, some known traffic controllers are currently provided with the processing capability to perform these functions. In such applications, the vehicle detector can be modified to simply provide to the traffic controller a first output signal indicating that a motorized vehicle has been detected and a second output signal indicating that a bicycle has been detected. In response to the receipt of such signals, the traffic controller can then perform the timing signal processing for controlling the duration of the clearance interval. Similar considerations apply to the Phase Green signal processing.

While the above provides a full and complete disclosure of the preferred embodiments of the invention, various modifications, alternate constructions and equivalents will occur to those skilled in the art. For example, while the invention has been described with reference to a specific microprocessor, different types of microprocessor may be employed, as desired, along with compatible program routines to accomplish the same type of bicycle detect operations. In addition, while the preferred loop configuration has been described as a preformed loop with a parallelogram configuration having the dimensions and traffic lane placement as noted above, different dimensions and lane placements (such as a parallelogram loop extending entirely across the width of a traffic lane) may be employed as deemed suitable by the installer. Therefore, the above should not be construed as limiting the invention, which is defined by the appended claims.

What is claimed is:

1. A vehicle detector with bicycle detect and discrimination capability comprising:

an oscillator adapted to be coupled to a loop adjacent an intersection; a memory; and a processor operatively coupled to said oscillator and said memory, said memory having machine readable code stored therein, said machine readable code configured to enable said processor to activate said oscillator to produce a signal for said loop, to implement a loop cycle counter for counting a predetermined number of loop oscillator cycles defining a sample period, to implement a sample counter for accumulating sample counts N during said predetermined number of loop oscillator cycles; to implement a reference counter for storing a reference count R based on the accumulated sample counts from a previous sample period; to implement an evaluation unit for determining from the sample counts N and the reference count R whether a vehicle has entered the loop during the sample period and for determining from the sample counts N and the reference count R whether a detected vehicle is a bicycle; and to implement a Call signal generator for generating a Call signal when the evaluation unit has determined that a vehicle has entered the loop during the sample period.

2. The vehicle detector of claim 1 wherein said machine readable code is configured to enable said processor to implement an Initial timer for establishing a clearance time sufficient to permit a detected bicycle to safely proceed through the intersection when the evaluation unit has determined that a bicycle has entered the loop during the sample period.

3. The vehicle detector of claim 1 wherein said vehicle detector includes a plurality of manually actuatable switches for enabling selection of a bicycle detect mode of operation; and wherein said machine readable code is configured to enable said processor to determine whether the bicycle detect mode of operation has been selected.

4. The vehicle detector of claim 3 wherein said machine readable code is configured to enable said evaluation unit to determine from the sample counts N and the reference count R whether a bicycle has entered the loop during the sample period.

5. The vehicle detector of claim 4 further including an output terminal coupled to said processor for manifesting a signal indicating the detection of a bicycle by said evaluation unit.

6. The vehicle detector of claim 3 wherein said machine readable code is configured to enable said processor to examine and interpret the actuation of at least one of said plurality of manually actuatable switches as a bicycle clearance time value to be used for said initial timer; and wherein said machine readable code is configured to enable said processor to determine selection of the bicycle detect mode of operation when the value of said bicycle clearance time is non-zero.

7. The vehicle detector of claim 1 wherein said vehicle detector includes a plurality of manually actuatable switches for enabling entry of a value corresponding to the selection of a bicycle only detect mode of operation in which only bicycles are detected; and wherein said machine readable code is configured to enable said processor to determine whether the bicycle only detect mode of operation has been selected.

8. The vehicle detector of claim 2 wherein said vehicle detector includes a plurality of manually actuatable switches; and wherein said machine readable code is configured to enable said processor to examine and interpret the actuation of at least one of said plurality of manually actuatable switches as an extension time value to be used by said initial timer when a subsequent bicycle is detected over said loop in order to provide additional bicycle clearance time for said subsequent bicycle.

9. The vehicle detector of claim 8 wherein said machine readable code is configured to enable said processor to compare the present value of the contents of the initial timer with the extension time value, to select the extension time value as the bicycle clearance time when the extension time value exceeds the current initial time value, and to continue to use the current initial time value otherwise.

10. The vehicle detector of claim 1 further including a squaring circuit coupled between said oscillator and said processor for processing the signal produced by said oscillator when activated by said processor.

11. The vehicle detector of claim 1 wherein said machine readable code is configured to enable said evaluation unit to detect a bicycle by determining from the sample counts N and the reference count R whether the ratio of $-\Delta L/L$, where L is the loop inductance, lies within a range from a non-zero minimum value to a preselected maximum value Bmax.

12. The vehicle detector of claim 11 wherein Bmax is 0.7%.

13. The vehicle detector of claim 11 wherein said non-zero minimum value is 0.001%.

14. The vehicle detector of claim 1 wherein said machine readable code is configured to enable said evaluation unit to detect a bicycle by determining from the sample counts N and the reference count R whether the signature derived from a collection of ratios of $-\Delta L/L$, where L is the loop inductance, indicates a bicycle or a motorized vehicle.

15. The vehicle detector of claim 1 further including a loop coupled to said oscillator.

16. The vehicle detector of claim 15 wherein said loop is configured in the shape of a parallelogram.

17. The vehicle detector of claim 16 wherein said parallelogram extends across a traffic lane.

18. The vehicle detector of claim 17 wherein said parallelogram has two opposing sides which are substantially coincident with opposing edges of said traffic lane.

19. The vehicle detector of claim 15 wherein said loop has an external sheath fabricated from cross-linked polyethylene.

20. The vehicle detector of claim 19 wherein said loop includes a water block material incorporated within said outer sheath.

* * * * *